United States Patent [19]

Okamoto et al.

[11] Patent Number: 5,708,805
[45] Date of Patent: Jan. 13, 1998

[54] IMAGE RETRIEVING APPARATUS USING NATURAL LANGUAGE

[75] Inventors: Shusaku Okamoto; Masahiro Hamada, both of Osaka, Japan

[73] Assignee: Matsushita Electric Industrial Co., Ltd., Osaka, Japan

[21] Appl. No.: 135,294

[22] Filed: Oct. 12, 1993

[30] Foreign Application Priority Data

Oct. 9, 1992 [JP] Japan .................................. 4-271332

[51] Int. Cl.$^6$ ........................................................ G06F 17/30
[52] U.S. Cl. ............................ 395/603; 395/614; 395/615
[58] Field of Search ...................... 364/DIG. 1, DIG. 2; 395/600, 603, 604, 614, 615; 382/305, 307

[56] References Cited

U.S. PATENT DOCUMENTS

| | | | |
|---|---|---|---|
| 4,695,975 | 9/1987 | Bednij | 364/900 |
| 4,918,588 | 4/1990 | Barrett et al. | 364/200 |
| 5,109,439 | 4/1992 | Froessl | 382/61 |
| 5,197,005 | 3/1993 | Shwartz et al. | 364/419 |
| 5,243,693 | 9/1993 | Maron | 395/135 |
| 5,267,333 | 11/1993 | Aono et al. | 382/56 |
| 5,276,805 | 1/1994 | Hamaguchi | 395/164 |
| 5,317,508 | 5/1994 | Okamoto et al. | 364/419.01 |
| 5,386,556 | 1/1995 | Hedin et al. | 395/600 |
| 5,459,829 | 10/1995 | Doi et al. | 395/152 |
| 5,493,677 | 2/1996 | Balogh et al. | 395/600 |
| 5,495,562 | 2/1996 | Denney et al. | 395/121 |

FOREIGN PATENT DOCUMENTS

| | | |
|---|---|---|
| 1-206432 | 8/1989 | Japan . |
| 2-220177 | 9/1990 | Japan . |

*Primary Examiner*—Thomas G. Black
*Assistant Examiner*—Maria N. Von Buhr
*Attorney, Agent, or Firm*—Ratner & Prestia

[57] ABSTRACT

An image retrieving apparatus including a language analyzer, an object determiner, a rule for defining an undefined object, an image selector, a display, a word dictionary, and an image database. The language analyzer analyzes an input sentence and extracts objects of the input sentence. The object determiner determines whether the object data expresses a background or a part using a rule for defining an undefined object. Images of background and parts are separately retrieved.

8 Claims, 10 Drawing Sheets

FIG. 1

```
(
201─( CLASS yama/ mountain )
202─( LOWER-CLASS ( fujisan/Mt.-Fuji arupusu/Alps————))
203─( COMMON-KNOWLEDGE
   204─( CLASS-ATTR BG )
   205─( ATTR-VAR ( HEIGHT PLACE ))
   )
)
```

FIG. 2A

```
(
201─( CLASS arupusu / Alps )
   203─( COMMON-KNOWLEDGE
      204─( CLASS-ATTR BG )
   )
   206─( IMAGE-FILE ( Geneva-1 Alps-1————))
)
```

FIG. 2B

```
(
201─( CLASS mizuumi / lake ))
202─( LOWER-CLASS ( remanko/Lake-Leman biwako/Lake Biwa————))
203─( COMMON-KNOWLEDGE
   204─( CLASS-ATTR BG )
   205─( ATTR-VAR ;LACE )
   )
)
```

FIG. 2C

```
(
201─( CLASS ( remanko/Lake-Leman )
203─( COMMON-KNOWLEDGE
   204─( CLASS-ATTR BG )
   )
206─( IMAGE-FILE ( Geneva-1 Lake-Leman————))
)
```

FIG. 2D

```
(
201─( CLASS junehbu/Geneva )
203─( COMMON-KNOWLEDGE
  204─( CLASS-ATTR BG )
  )
206─( IMAGE-FILE ( Geneva-1 Geneva-2----- ))
)
```

FIG. 2E

```
(
201─( CLASS herikoputah/helicopter)
203─( COMMON-KNOWLEDGE
  204─( CLASS-ATTR NOT-DEF )
  205 ─( ATTR-VAR COLOR )
  )
206─( IMAGE-FILE ( helicopter-1 helicopter-2----- ))
)
```

FIG. 2F

```
(
201─( CLASS yama/ mountain maunten/mountain ))
202─( LOWER-CLASS ( fujisan/Mt.-Fuji arupusu/Alps----))
203─( COMMON-KNOWLEDGE
  204─( CLASS-ATTR BG )
  205 ─( ATTR-VAR (HEIGHT PLACE ))
  )
)
```

```
        ( IMAGE Geneva-1 )
401 ─( IMAGE-DATA Geneva-1.img )
402 ─( IMAGE-ATTR BG )
       ( BELONG-CLASS arupusu/Alps )
       ( HEIGHT 3500 )
403 ─( PLACE suisu/ Switzerland )

( BELONG-CLASS remanko/ Lake-Leman )
403 ─( PLACE suisu/ Switzerland )

( BELONG-CLASS junehbu/ Geneva )
403 ─( PLACE suisu/ Switzerland )
```

FIG. 4A

```
       ( IMAGE helicopter-1 )
401 ─( IMAGE-DATA helicopter-1.img )
402 ─( IMAGE-ATTR PARTS )
       ( BELONG-CLASS herikoputah/helicopter )
403 ─( COLOR WHITE )
```

FIG. 4B

| type of analytical result | number of objects contained in sentence | | | attribute of undefined object |
|---|---|---|---|---|
| | background | part | undefined | |
| A | - | - | △ | background |
| B | - | - | ⊙ | (part) |
| C | - | ○ | △ | background |
| D | - | ○ | ⊙ | (part) |
| E | ○ | - | ○ | part |
| F | ○ | ○ | ○ | part |

IMAGE RETRIEVING APPARATUS USING NATURAL LANGUAGE

BACKGROUND OF THE INVENTION

1) Field of the Invention

The present invention relates to an apparatus for retrieving a plurality of image components by means of natural language, which is particularly useful for inserting appropriate images into a document such as pamphlets and manuals while using a word processor.

Since images contain more information and are more concrete or real than natural language, many images are employed in various documents such as pamphlets and magazines.

In addition, word processors having the capability to insert photographs into a document are becoming available in the home. In order to implement the above-mentioned function in a word processor, it is desirable that the appropriate images can be easily retrieved.

2) Description of the Prior Art

Several methods have been developed for retrieving images appropriate for the content of a sentence which is input with natural language.

One example appears in a reference, "A Retrieving System for Image Database", Takahashi, Shima and Kishino, the Technical Report of the Institute of Electronics, Information and Communication Engineers, PRU-89-80, pp. 23–28, 1989.

In this method, modeling is conducted for relationships between entities contained in an image, for whole images which have been previously stored in the database utilizing a hierarchical expression or for an entity-relation expression and modeling is also conducted for the content expressed by an image. The modeling is stored as an image retrieving information.

In this method, an image retrieving procedure is done in the following way: First, an inquiring sentence is input which describes the content of an image which one wants to retrieve. Next, the content of the sentence is converted into a data form by language analysis that enables a calculation to be performed to determine the degree of similarity between said sentence content and said image retrieving information. Finally, the degree of similarity between the data and every image retrieving information is calculated, and then the result is listed in sequence of high similarity.

One problem with this method is that modeling has to be conducted in advance for whole images that have been stored. The operation of modeling is difficult to automate and may need to be done manually, which consumes much labor and time.

Another problem of this method is that an input sentence has to be converted to a data form that enables the system to calculate the degree of similarity with the image retrieving information. If the input sentence is not grammatically regulated, it is difficult to make a reasoning rule to convert a sentence to data form. Conversely, if an input sentence is regulated by a reasoning rule, the grammatical freedom of an input sentence is constrained. Thus it is difficult to use the system.

Still another problem is that it may only retrieve images which express or form an entire "scene". Further it may not combine an image that expresses background and an ordinary image that is cut out from what constitutes a scene. In other words, the method may not be suitable for image retrieving designed for editing images.

Therefore, an image retrieving apparatus having the capability, that makes it possible to use input sentences having rather high grammatical freedom and to retrieve all images desirable for depicting the content of the sentence is a desirable goal.

SUMMARY OF THE INVENTION

An image retrieving apparatus of the present invention comprises; a word dictionary for storing information necessary for analyzing sentences; an image database for storing image components that consist of pixel (picture element) data and an attribute value which expresses quantitatively the characteristics of said pixel data; a controlling means for object data for storing object data, that consists of an appellation for an object which exists as an entity, common knowledge concerning the object, and a pointer that points to an image component which expresses the entity of the object; an analyzing means for language for analyzing a sentence using the word dictionary, extracting an object enabling image expression based on said analytical result, and retrieving an object data concerning said object from said controlling means for object data; a discriminating means for the object for discriminating whether an object expresses a background or a part by using common knowledge concerning said object data; a selecting means for image wherein a plurality of object data are input, pixel data of image components pointed to by a pointer in the object data are selected for every object data, and only pixel data pointed to by all the object data are selected; a rule for defining an undefined object, for storing a rule that decides whether an undefined object is a background or a part; and a displaying means for displaying a pixel data of an image component.

According to the present invention, a natural language requesting for a desired image is input, an object data is retrieved by said analyzing means for language that analyzes the input sentence, and it is decided whether the object data is a background or a part by said discriminating means for object.

Consequently, if a plurality of objects expressing background are obtained, an object among the plurality of objects is not distinguished one from another, but pixel data selected from said plurality of objects by said selecting means for image are regarded as a result of retrieval for a plurality of background objects. On the other hand, if a single background object is obtained, a pixel data retrieved by the object data corresponding to the background object is regarded as a result of retrieval.

As to part of the object, a pixel data value is retrieved distinctively for each object that is extracted.

DESCRIPTION OF AN EXEMPLARY EMBODIMENT

Figure 1:
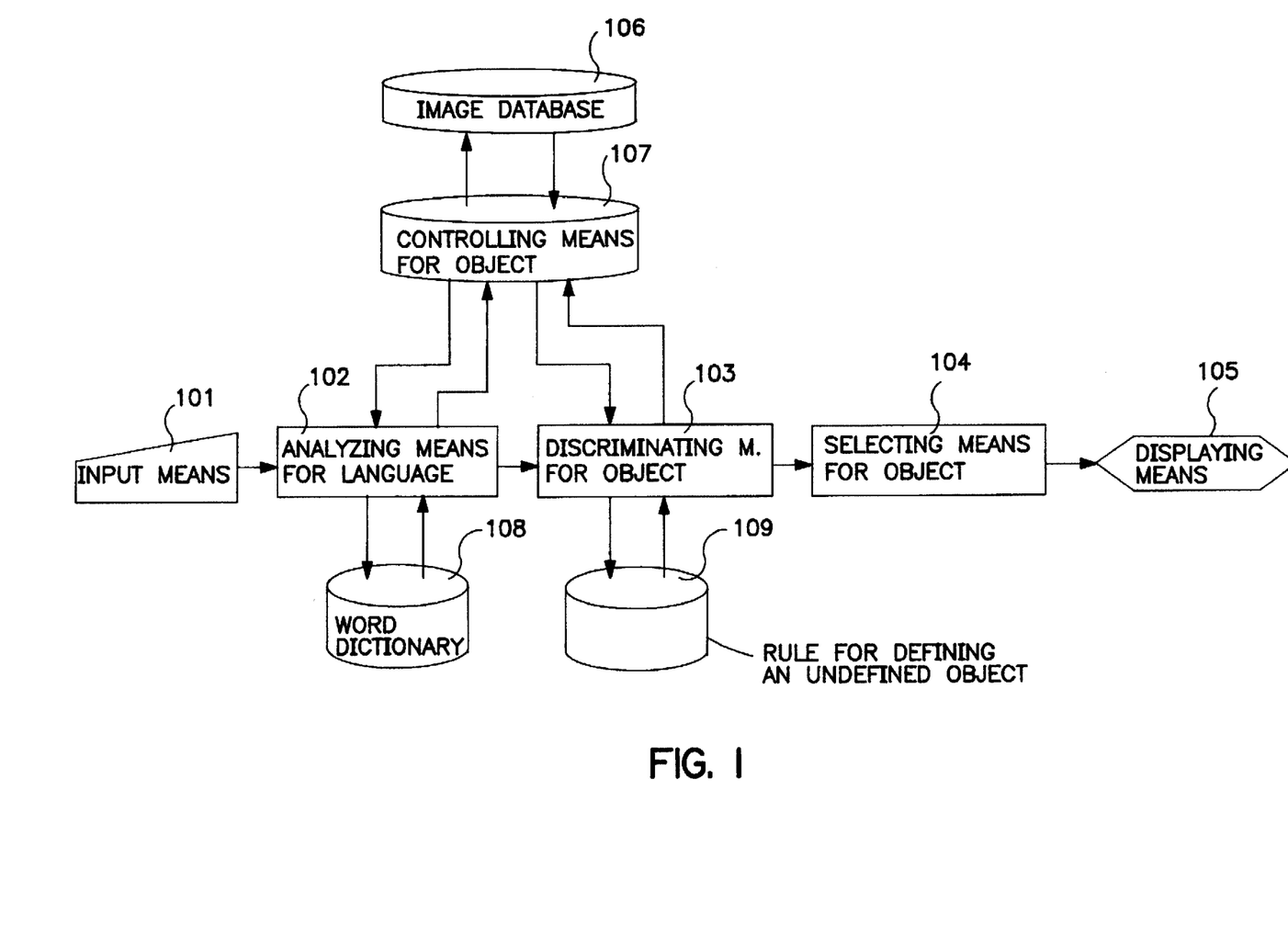
FIG. 1 shows a preferred embodiment of an image retrieving apparatus of the present invention.

FIG. 1 shows the block diagram of an exemplary embodiment of an image retrieving apparatus according to the present invention, comprising an input means 101 for inputting a sentence; an analyzing means for language 102 for extracting an object enabling image expression from a sentence and retrieving an object data corresponding to said object; a discriminating means for object 103 for deciding whether said object is a background or a part; a rule for defining an undefined object 109; a selecting means for image 104 wherein a plurality of object data are input and only the pixel data that includes all the objects is selected; a displaying means for pixel data 105; a word dictionary 108; a controlling means for object data 107 that stores object data; and an image database 106 that stores image components.

FIGS. 2(a)–2(f) show object data in the form of lists that are included in the controlling means for object data 107.

Object data comprises a name for an object 201, a pointer to a lower level object 202, common knowledge concerning the object 203, and a pointer to image components expressing the identity of said object 206, in this case they are labeled as CLASS, LOWER-CLASS, COMMON-KNOWLEDGE, and IMAGE-FILE, respectively.

CLASS is a label representing the descriptive part for a name of an object according to the present invention, and is expressed as;

(CLASS a name of an object)

In the case of FIG. 2 (a), it represents the descriptive part of an object, i.e., "yama/mountain"

The descriptive part of the object here identifies both English as well as the corresponding Japanese phonetic. Implementation of the system is independent of the particular language used. Here, Japanese phonetic and English are provided as examples. Therefore, hereafter the Japanese in phonetic representation precedes translated English by a slash.

LOWER-CLASS is a label representing the descriptive part of an object that is conceptually at a lower level according to the present invention. LOWER-CLASS is expressed as;

(LOWER-CLASS a lower level object, or its list)

Figure 2A:
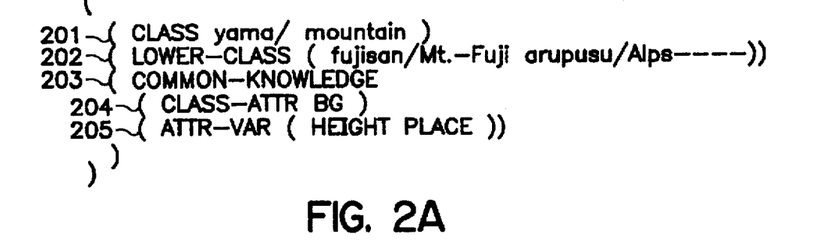
FIGS. 2(a)–2(g) shows object data in the form of a list according to an exemplary embodiment of the present invention.

In FIG. 2(a), it represents a lower level object against an object yama/mountain", i.e fujisan/Mt.-Fuji", "arupusu/ Alps", etc.

Therefore when a lower level object against a certain object is to be retrieved, the LOWER CLASS should be referred to.

Figure 3:
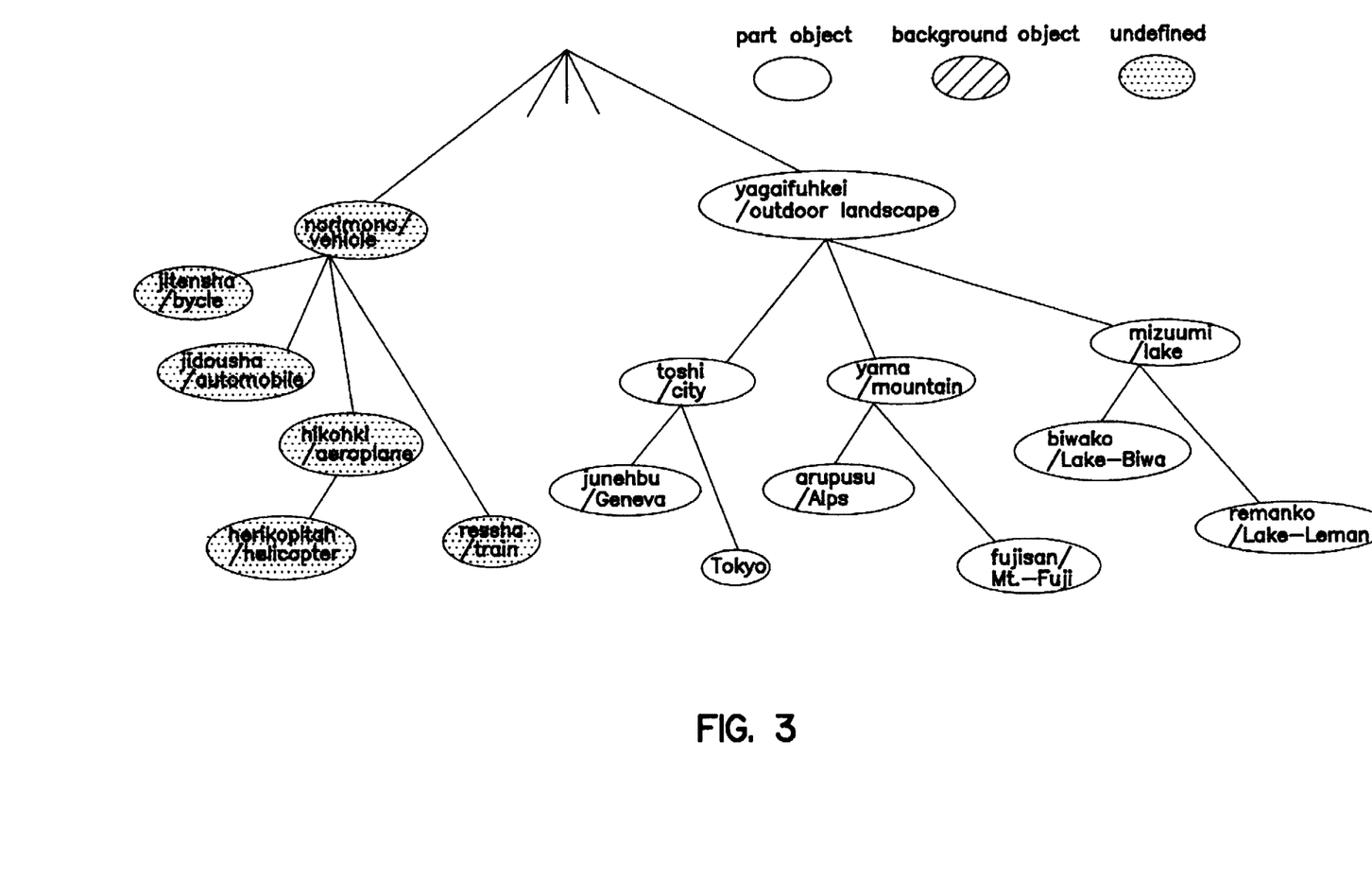
FIG. 3 shows a relationship between high and low levels of object data according to an exemplary embodiment of the present invention.

FIG. 3 shows conceptually relationships between lower or higher level objects.

Where an object such as "arupusu/Alps" is sufficiently defined and it is difficult to proceed to further definition, no lower level description data will be self-explanatory.

COMMON-KNOWLEDGE is a label representing the descriptive part of common knowledge concerning an object according to the present invention, and is expressed as;

(COMMON-KNOWLEDGE common knowledge, or its list)

In FIG. 2(a), common knowledge concerning "yama/ mountain" is described as;

(CLASS-ATTR BG)
(ATTR-VAR (HEIGHT PLACE))

CLASS-ATTR is a label for determining whether an object expresses a background or a part, and the term following the label represents a discrimination, for which three values, BG, PART, and NOT-DEF are prepared.

The meaning of each value:

BG: an object representing a background

PART: a foreground object existing in a background, or a part.

NOT-DEF: it depends upon a condition whether it is a background or a part

Accordingly, in FIG. 2(a), "yama/mountain" is discriminated as an object representing a background. Examples of objects which are discriminated as NOT-DEF are:

"A train runs at the foot of a mountain"

"I see a sea through a window of a train"

The former object "train" represents the appearance of a train, while the latter object "train" represents inside of a train. In another word, an object of the same name, "train" may be a background or a part, depending upon a condition. When such an object is extracted based on the analysis of a sentence, it is decided whether the object is a background or a part. The decision procedure will be described in detail later in the explanation of the image retrieving procedure.

ATTR-VAR 205 is a label representing information concerning attributes that differentiates an image expressing the entity of an object where attributes are listed in the next term or in the list.

In FIG. 2(a), two kinds of attributes, HEIGHT and PLACE are defined, and thereby real values for HEIGHT and PLACE are given to an image expressing an object "yama/mountain".

By utilizing such values, according to the method described in Japanese Patent Provisional Publication No. 5-94478/1993, an image expressing an object of "yama/ mountain" is evaluated, and thereby it is possible to retrieve images in sequence of high evaluation value. Japanese Patent Provisional Publication No. 5-94478/1993 is incorporated herewith by reference.

IMAGE-FILE 206 is a label representing a pointer to an image component expressing the entity of an object according to the present invention, where the next term identifies the names of files that store the image components listed as a pointer.

Figure 2B:
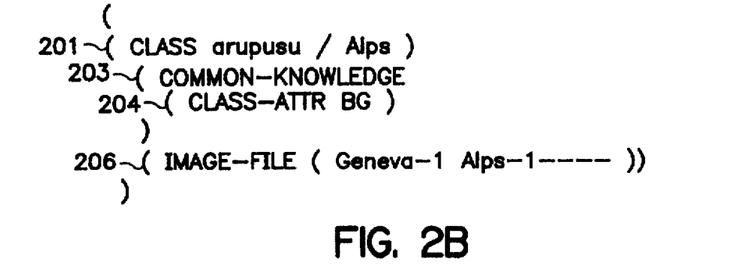
Figure 2C:
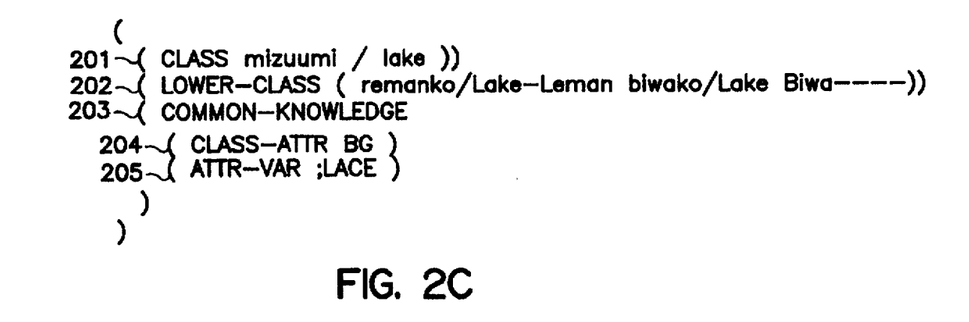
Figure 2D:
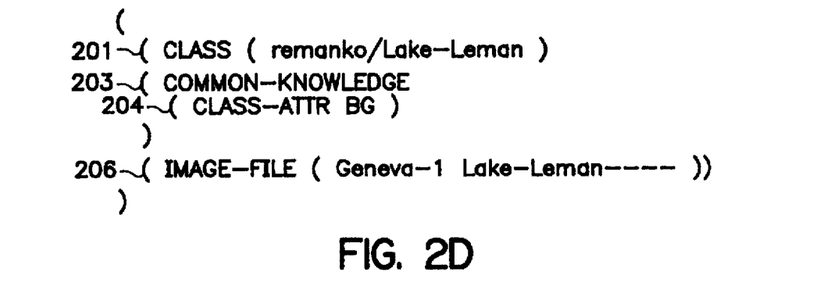
Figure 2E:
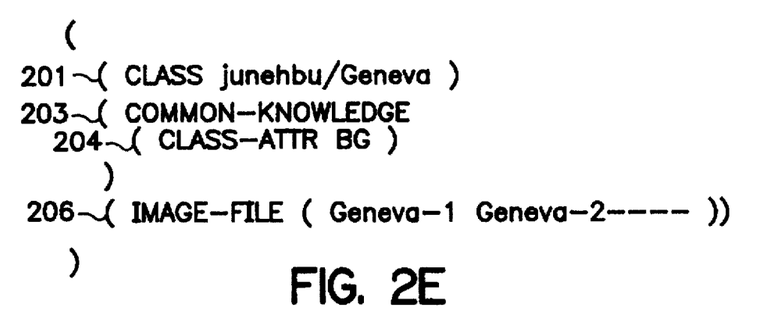
Figure 2F:
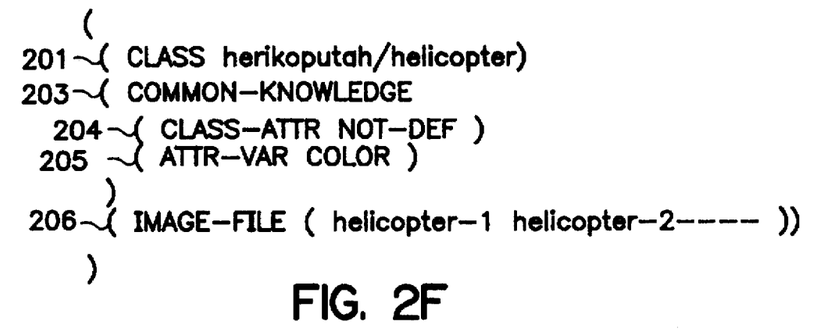

In FIG. 2(b), it can be seen that Geneva-1", "Alps-1", etc. are the files that store images containing an object, "Arupusu/Alps".

Figure 4A:
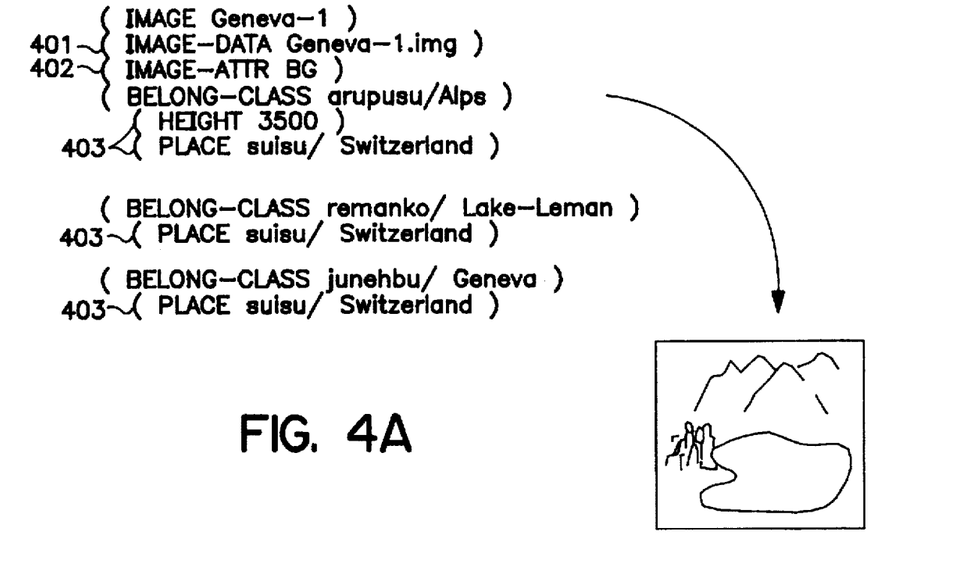
FIGS. 4(a) and 4(b) shows image components in the form of list according to an exemplary embodiment of the present invention.
Figure 4B:
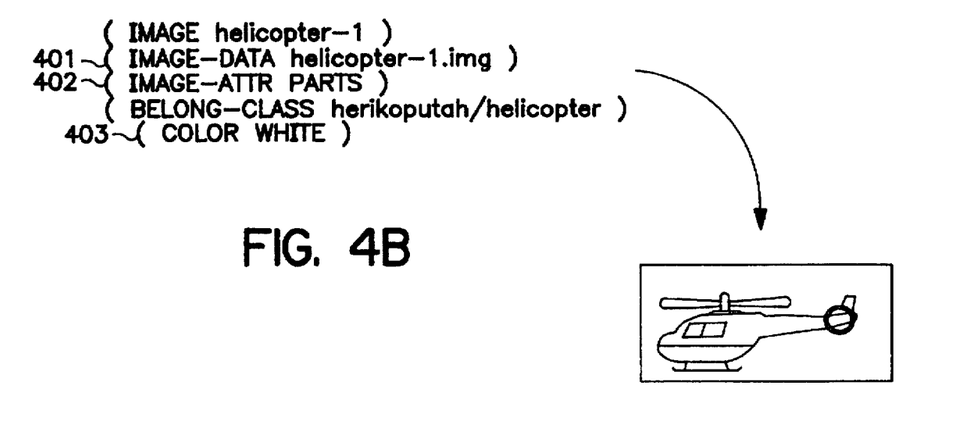

FIG. 4(a) and 4(b) show image components that constitute the image database 106 in the form of list.

An image component consists of a pixel data 401, discriminating information 402 telling whether an object corresponding to the entity expressed by the pixel data is a background of a part, and attributes 403 that indicates quantitatively the characteristics of the pixel data. These are labeled IMAGE-DATA, IMAGE-ATTR, and BELONG-CLASS, respectively.

IMAGE-DATA represents a pixel data, and usually records information representing an image such as color information for each pixel. For convenience of explanation, the term next to IMAGE-DATA is regarded as a to said information. Further explanation will follow.

IMAGE-ATTR is a label representing discriminating information 402 that tells whether an object according to the present invention is a background or a part, where the next term is the discriminator. Two values, BG and PARTS are used, and their meanings are the same as for the object data. In FIG. 4(a) it is discriminated as an image component expressing a background.

BELONG-CLASS is a label representing attributes 403 concerning an attribute value that indicates quantitatively the characteristics of the pixel data of an image component or which is described distinctively for each entity expressed by a pixel data.

In BELONG-CLASS, the term of an object is given, indicating to which objects attribute values belong. In the subsequent terms real values for an attribute defined for the object in ATTR-VAR, see FIG. 2(a), are given. In FIG. 4(a), objects contained in a pixel data "Geneva-1 img." are "arupusu/Alps", "remanko/Lake-Leman", and "junehbu/Geneva". As to "Arupusu/Alps", for example, real values for the attribute of its higher-level object "yama/mountain" are given as 3500 meter in height and Switzerland in place. On the other hand, in FIG. 4(b), there is only one entity expressed in a pixel data, there exists only one BELONG-CLASS.

Figure 5:
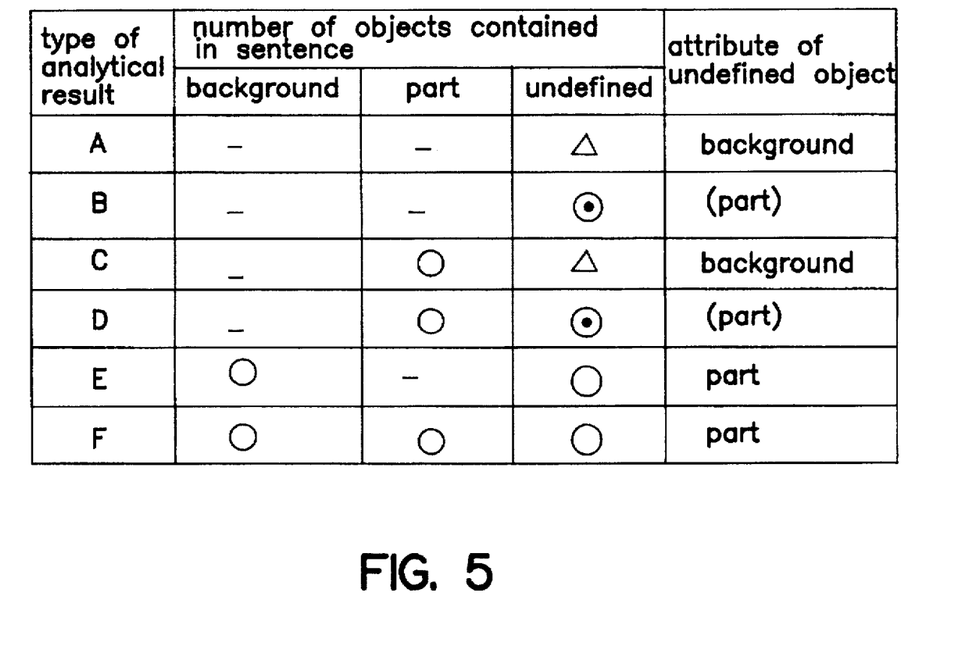
FIG. 5 shows a rule for defining an undefined object in the form of a table according to an exemplary embodiment of the present invention.

FIG. 5 is an example of a rule for defining an undefined object 109 expressed in the form of table. In this example, when an undefined object is extracted from an input sentence, the number of each object for background, part and not-defined is counted. Then, by conforming the numbers to either raw of the table, the undefined object can be decided to be a background of a part. The method for deciding an undefined object using this rule will be described later in the explanation of a discriminating means for object.

Figure 6:
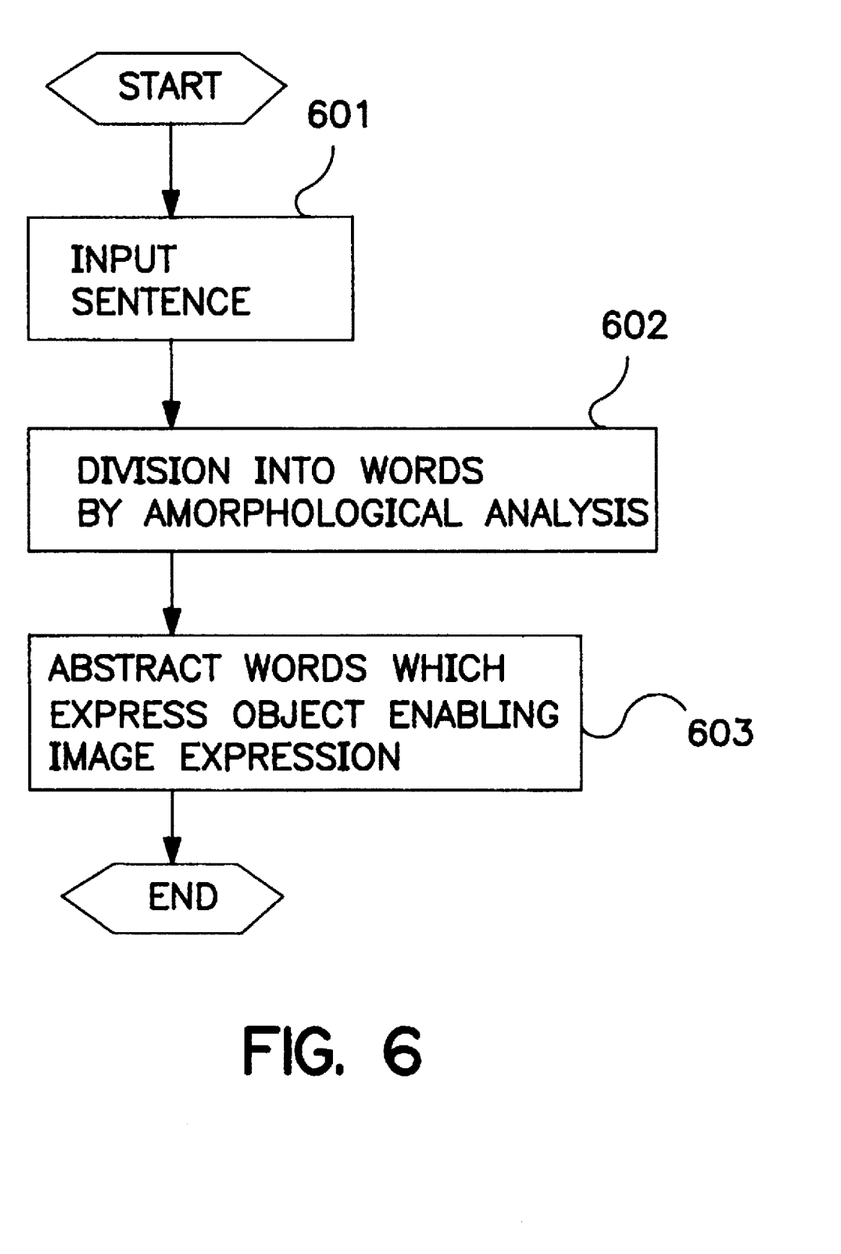
FIG. 6 shows a flow chart representing processing by analyzing means for language.

In FIG. 1, an analyzing means for language 102 analyzes a sentence input by input means 101 with the aid of a word dictionary, and thereby extracts those objects from the input sentence that enables image expression. The operation is illustrated by FIG. 6.

First, a sentence is input (601) by the input means, and is divided into words by morphological analysis (602), with the aid of the word dictionary 108.

The method of morphological analysis and the organization of the word dictionary 108 are described in, for example, "The Basics of Understanding Natural Language—Morphology", T. Hidaka, the Journal of the Information Processing Society of Japan, Vol. 30, No. 10, pp. 1169–1175, 1989, which is incorporated herewith by reference.

Next, out of the words obtained, words expressing object enabling image expression are extracted (603). Then each word is examined to see if it coincides with any object in the object data that have been registered in the controlling means for object 107.

If any object data whose name coincide with the extracted word is found then the extracted, word is regarded as a word which enables image expression. Then the object data is sent to the discriminating means for object 103. Then the next word is processed in the same way. If no object is found, the extracted word is regarded as not enabling image expression, and the next word is processed in the same way.

Processing by the analyzing means for language 102 ends when retrieving all of the words is executed.

Figure 2G:
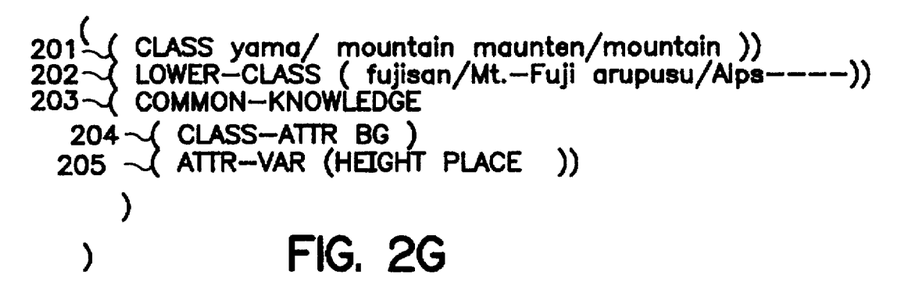

In example of FIG. 2(a), a name is "yama/mountain", therefore "maunten/mountain" expressing the same thing could not be used as a retrieving word. However, by listing names expressing objects as object names as shown in FIG. 2(g):

(CLASS (yama/mountain maunten/mountain))

Many more words expressing a object can be used in an input sentence.

Figure 7:
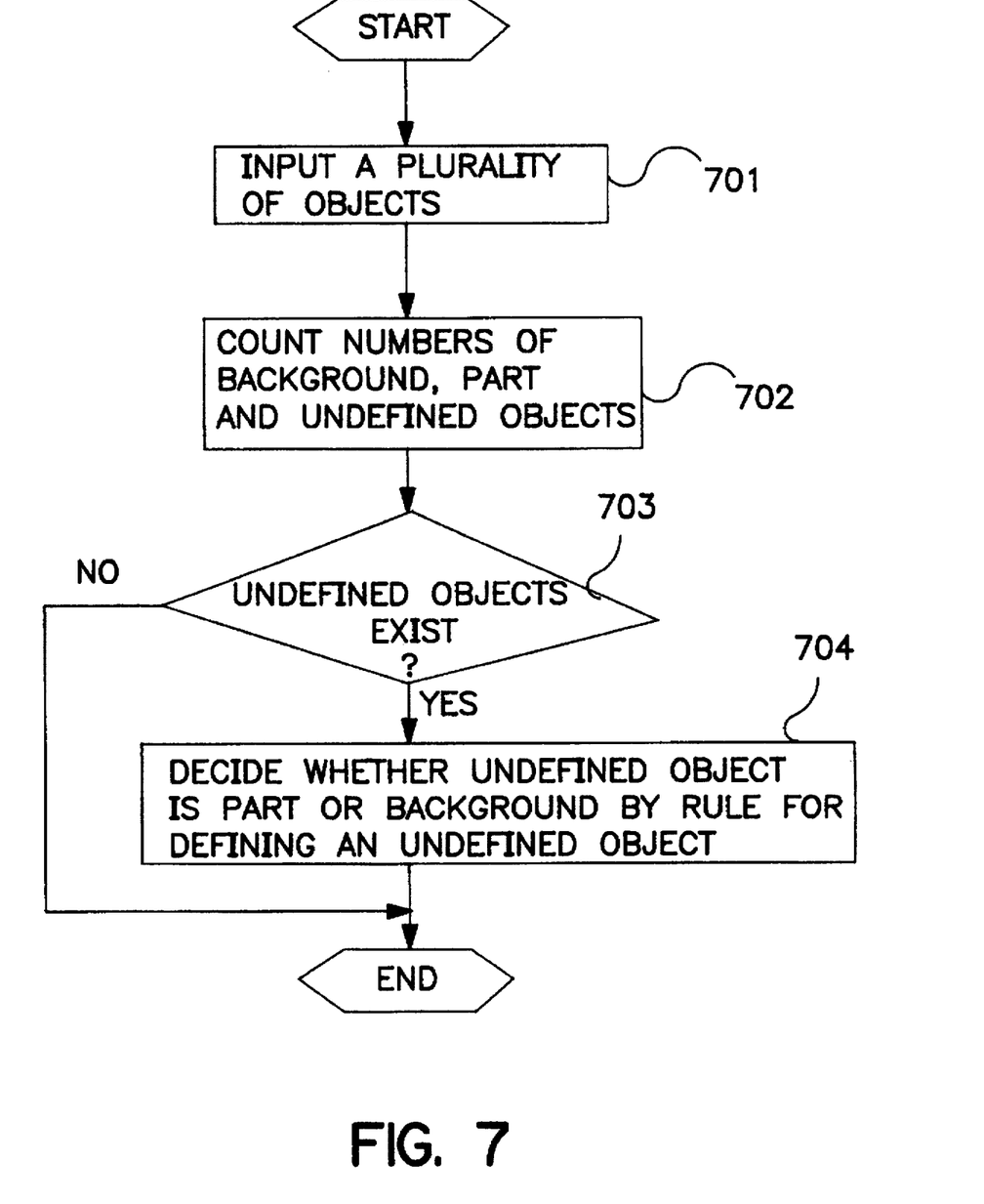
FIG. 7 shows a flow chart representing processing by a discriminating means for object.

In FIG. 1, a discriminating means for object 103 discriminates whether an object is a background or a part using common knowledge 203 concerning the object data and the rule for defining an undefined object 109. An example of discriminating procedure is shown in FIG. 7.

Most objects are defined to be either a background or a part, and this is given in the common knowledge 203. Therefore discrimination can be executed referring to said common knowledge. In the object data shown in the embodiment of FIG. 2, the discriminating information in the form of the common knowledge is written as;

(CLASS-ATTR BG), or
(CLASS-ATTR PARTS), thereby allowing discrimination to be executed.

However, as already described in CLASS-ATTR of object data, a few objects may be a background or a part depending upon a condition. In this case discrimination needs a reasonto account for the condition. In this exemplary embodiment, the input sentence is analyzed using discriminating means for object 103, to obtain condition results from the discrimination result of objects data.

Using the result and the rule for defining an undefined object shown in FIG. 5, it will be decided whether an undefined object is a background or a part.

First, object data that are extracted by the analyzing means for language 102 are classified into a background, a part and undefined, as shown in FIG. 7. The number of objects in each category is counted in steps 701, 702, and then it is examined whether there exist undefined objects in step 703.

If undefined objects exist, it is decided whether they are a background or a part in the following way.

By fitting the number of objects in each category to the number as coded in each of the second to the fourth columns of the table shown in FIG. 5, analysis result type out of A to F in the first column for the sentence can be decided, thereby the discriminating result for the undefined objects being obtained in the fifth column. In the table, marks "–", "Δ", "○", and "⊙" means that the number of objects is zero, one, more than one, and more than two, respectively.

Analysis results B and D give a discriminating result of (part) instead of part. The parenthesis means that when retrieving components are defined as a part they are to be retrieved prior to the others.

Figure 8A:
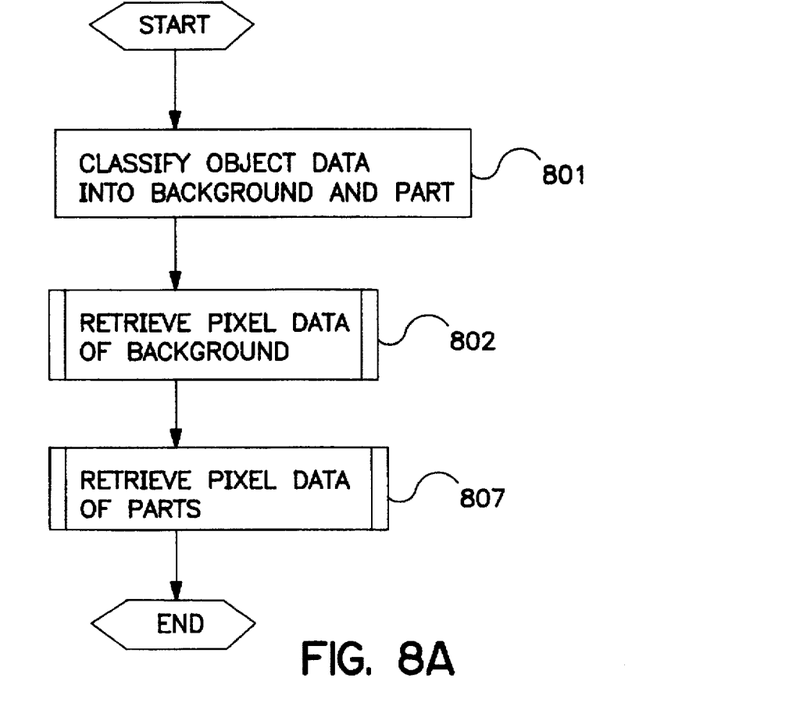
FIGS. 8(a)–8(c) shows a flow chart representing processing by a selecting means for image.
Figure 8B:
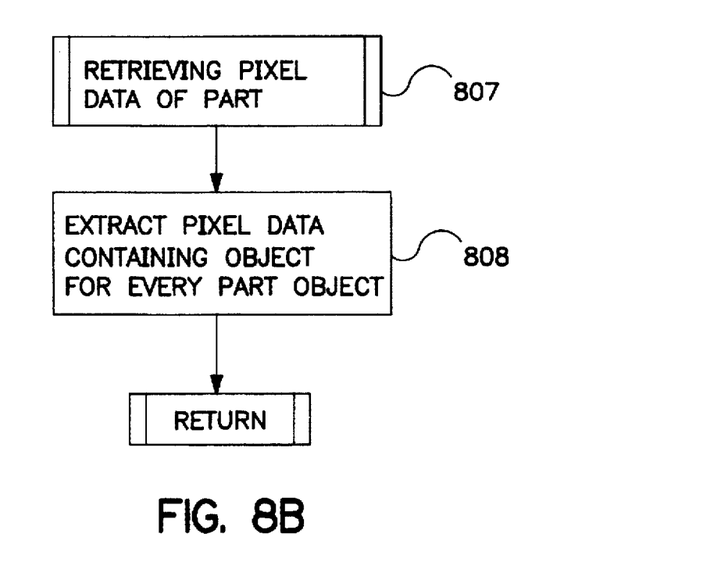
Figure 8C:
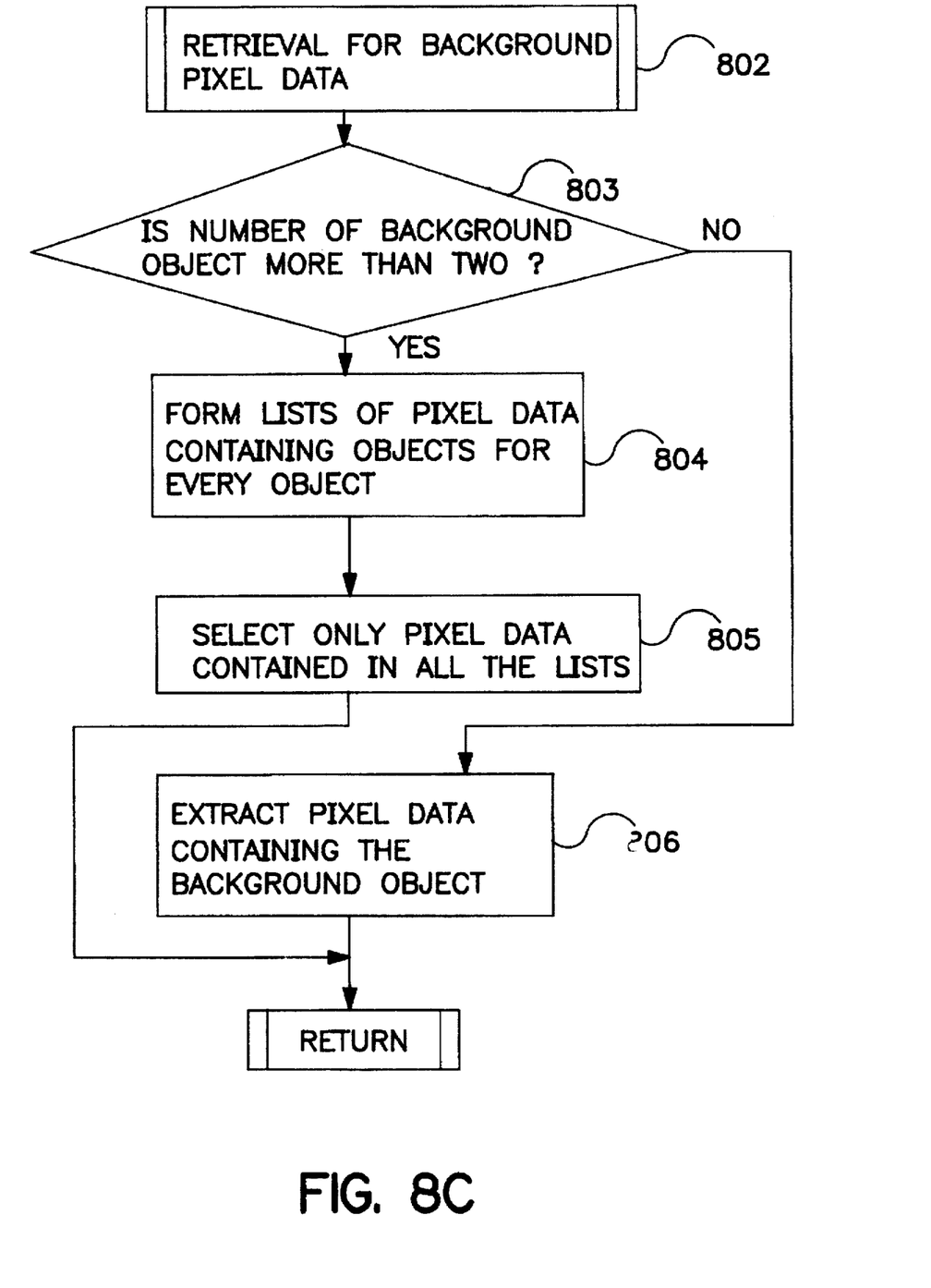

In FIG. 1, the selecting means for image 104 takes in a plurality of object data, extracts pixel data of image components pointed to by a pointer of said object data, for each object, and selects only pixel data pointed to by all object data. The procedure is illustrated in FIGS. 8(a)–8(c).

After object data are classified into a background and a part in step 801, background pixel data are retrieved in step 802, and then part pixel data are retrieved in step 803. The detailed procedure of each retrieval is as follows.

For retrieval for background pixel data 802, the number of background objects are counted (803).

If the number of background objects is more than two, image components containing the object are extracted by following pointers of the object data. The list of pixel data described in image components is formed for each object data is step 804. Next, any object data out of input object data is selected, and then is processed (805) as described below:

1) Select one pixel data from the list from the selected object data.

2) If the pixel data is contained in all of the other lists, then the pixel data is left behind while the other pixel data is deleted.

3) If other pixel data remains in the list, repeat step 2)

Finally, pixel data left behind, by step 805, in the list for the selected object data are outputted, and processing by the selecting means for image 104 ends.

If the number of background objects is only one, image components containing object are extracted by following pointers of the object data. Then pixel data described in the image components are outputted.

In the retrieval pixel of part, data 807, image components containing object are extracted by following pointers of the object data. This is similar to the case when the background object is only one. Then pixel data described in the image components are outputted by step 808.

Above, retrieval for background pixel data was performed prior to retrieval for part pixel data. However, it does not make a difference in retrieval results if retrieval for background and for part are exchanged.

In the preceding paragraphs, various means that constitute a system of the present invention and various data structure thereof have been explained, and in the following paragraphs the operation of the retrieving method of the present invention will be explained referring to FIG. 1 to FIG. 8.

For the purpose of explaining the operation, the following sentence is assumed to be input:

"herikoputahdeyamatomizuuminoutsukushiij unehbunojoukuuhe/by a helicopter toward the sky over Geneva of beautiful mountain and mizuumi/lake" (1)

Step 1. The sentence (1) is put in by the input means 101, and is converted to a data letter string. It is thensent to the analyzing means for language 102.

Step 2. In the analyzing means for language 102, using morphological analysis the sentence (1) is divided into words as follows:

"herikoputah/helicopter de/by yama/mountain to/and mizuumi/ mizuumi/lake no/of utsukushii/beautiful junehbu/Geneva no/over jookuu/sky he/toward" (2)

Next, each word obtained is examined to determine whether it coincides with any object name in object data registered in the controlling means for object 107.

If a tree-shaped organization that relates between object data as shown in FIG. 3 is assumed, among a plurality of words in the sentence (2) "herikoputah /helicopter", "yama/ mountain" "mizuumi/mizuumi/lake" and "junehbu/Geneva" are found to have their object data, thereby object data corresponding to said four words being extracted.

Step 3. By the discriminating means for object 103, it is discriminated whether each of objects "helicopter" "yama/ mountain" "mizuumi/lake" and "Geneva" is a background or a part using the common knowledge of each object data and the rule for defining an undefined object 109.

If an example of object data shown in FIG. 2 (a) to (f) is assumed, each of the objects is discriminated as follows:
background: "yama/mountain", "mizuumi /mizuumi/ lake", and "junehbu/Geneva"
undefined: "herikoputah/helicopter"

As an undefined object "herikoputah /helicopter", it has to be decided whether it is a part or a background using the rule for defining an undefined object 109 shown in FIG. 5.

By processing by the analyzing means for language 102 the number of objects in each category of background, part and undefined is found to be 3, 0, and 1, respectively.

The type of analytical result corresponding to these numbers is E in FIG. 5. This indicates that the undefined object "herikoputah/helicopter" is a part.

Step 4. After all the object data have been defined, their image components of background and parts are separately retrieved using the selecting means for image 104.

As for background image, in order to retrieve an image which contains all of "yama/mountain", "mizuumi/lake", and "junehbu/Geneva", three object data, "yama/mountain", "mizuumi/lake", and "junehbu/Geneva," are input into the selecting means for image 104.

First, image components expressing each of said object are referred to, and the list containing pixel data retrieved from said image components is formed. The method of forming a list for an object data "yama/mountain" will be explained using an example of FIG. 2(a).

Although pixel data containing "yama/mountain" should be retrieved from image components which belong to object data "yama/mountain", there are no image components as registered in the object data. Therefore, image components of lower-level object data, i.e., "arupusu/Alps", "fujisan/ Mt.-Fuji" etc. as given in LOWER-CLASS are referred to, and their pixel data are retrieved from said image components. Eventually, the list contains all image data expressing object data which were at a lower-level to object data "yama/mountain". In the same way, lists for "mizuumi lake" and "junekbu/Geneva" are formed as described below:

yama/mountain: Geneva-1. img, Arupusu/Alps-1. img, etc. mizuumi/lake: Geneva-1. img, Mizuumi/lake-Leman. img, etc. junehbu/Geneva: Geneva-1. img, Geneva-2. img, etc.

Among these pixel data, a pixel data that contains all object data is selected. Taking the list of "yama/mountain" as an example, Geneva-1. img therein is also contained in all the other list as well. Thus Geneva-1. img is left behind, while Alps. img is deleted because it is not contained in all the other list as well.

In this way, Geneva-1 is extracted as a pixel data containing all object data, and is regarded as a retrieval result for background image.

As for the part image, its pixel data are retrieved distinctively. In this place, there exists only one part, i.e., "herikoptah/helicopter".

Image components which belong to object data "herikoptah/helicopter" are referred to, and the following pixel data are retrieved:

helicopter-1. img, helicopter-2. img, etc.

Any pixel data thereof can be used.

Step. 5 By the display means 105, pixel data thus retrieved, each for background and parts is distinctively displayed, and retrieving process comes to an end.

In the image retrieving system according to the present invention, images are classified beforehand into background and part, a sentence of natural language is put in inquiring for retrieval, the input sentence is analyzed, based on the analysis, background images and part images which constitute the foreground are automatically retrieved, thus all images which constitute a scene expressed by said input sentence can be retrieved.

If the image retrieving apparatus according to the present invention is incorporated into a system that executes editing and synthesizing image, it is possible to synthesize many scenes even from a small scale image database of the system by disposing part images upon a background image.

In addition, in the image retrieving apparatus according to the present invention, a rule is provided that defines an object as a background or a part based on a condition, and therefore images that are more strongly related to the content of a sentence can be retrieved.

What is claimed:

1. An image retrieving apparatus comprising:

a word dictionary that stores information for analyzing a sentence;

an image database that stores image components, each image component comprising a pixel data and an attribute, said pixel data having characteristics, said attribute indicating quantitatively said characteristics of said pixel data;

object controlling means for controlling object data for an object, said object data comprising a) a name for said object that expresses an entity, b) a common knowledge concerning said object, and c) a pointer that points to said image components in said image database that express said entity of said object;

sentence input means for inputting a sentence;

a language analyzing means for a) analyzing an input sentence using said word dictionary, b) extracting objects of said input sentence, and c) developing an image expression containing said object data from said object controlling means with respect to said extracted objects; and displaying means for displaying said pixel data of said image components pointed to by a plurality of said object data of said image expression.

2. An image retrieving apparatus according to claim 1, wherein said attribute of each of said image components has at least a name corresponding to said entity expressed by said pixel data of said image component and wherein said attribute for each entity is different.

3. An image retrieving apparatus according to claim 1, wherein at least one of said object data has a conceptually lower-level object and a second pointer corresponding to said lower-level object.

4. An image retrieving apparatus according to claim 1, wherein the plurality of said object data of said image expression is all of said object data of said image expression.

5. An image retrieving apparatus according to claim 1, wherein the plurality of said object data of said image expression is a maximum number of said object data of said image expression.

6. An image retrieving apparatus comprising:

a word dictionary that stores information for analyzing a sentence;

an image database that stores image components, each image component comprising a pixel data and an attribute, said pixel data having characteristics, said attribute indicating quantitatively said characteristics of said pixel data;

object controlling means for controlling object data for an object, said object data comprising a) a name for said object that expresses an entity, b) a common knowledge concerning said object, and c) a pointer that points to said image components in said image database that express said entity of said object;

sentence input means for inputting a sentence;

a language analyzing means for a) analyzing an input sentence using said word dictionary, b) extracting objects of said input sentence, and c) developing an image expression containing said object data from said object controlling means with respect to said extracted objects;

object discriminating means, using said common knowledge from said object controlling means, for discriminating whether each one of said extracted objects is a background or a part;

image selecting means for a) receiving a plurality of said object data from said image expression, b) determining if said plurality of said object data express said background, c) extracting said pixel data of said image components pointed to by said pointer of said object data which express said background and d) selecting only pixel data that are pointed to by said object data; and displaying means displaying said selected pixel data of said image components pointed to by said pointer of said object data of said image expression.

7. An image retrieving apparatus according to claim 6, wherein said object discriminating means has a rule for determining whether an undefined object is a background or a part.

8. An image retrieving apparatus according to claim 7, wherein said image components further include discrimination information for identifying whether said object which expresses said pixel data is said background or said part, and said object discriminating means, further using said discrimination information, for discriminating whether said object data is said background or said part.

* * * * *